(12) United States Patent
Mizes (10) Patent No.: US 7,643,678 B2
(45) Date of Patent: Jan. 5, 2010

(54) STREAK COMPENSATION WITH SCAN LINE DEPENDENT ROS ACTUATION

(75) Inventor: Howard Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 475 days.

(21) Appl. No.: 11/286,011

(22) Filed: Nov. 22, 2005

(65) Prior Publication Data

US 2007/0115338 A1 May 24, 2007

(51) Int. Cl.
*G06K 9/00* (2006.01)
*B41J 2/385* (2006.01)
*G06K 1/00* (2006.01)

(52) U.S. Cl. .......................... 382/162; 347/111; 358/1.9

(58) Field of Classification Search ................. 347/111, 347/239, 240; 345/596; 358/1.9; 382/162
See application file for complete search history.

(56) References Cited

U.S. PATENT DOCUMENTS

| | | | | |
|---|---|---|---|---|
| 4,733,252 A | * | 3/1988 | Daniele et al. | 347/239 |
| 5,581,376 A | * | 12/1996 | Harrington | 358/518 |
| 5,831,626 A | * | 11/1998 | Sano et al. | 345/596 |
| 6,252,675 B1 | * | 6/2001 | Jacobs | 358/1.9 |
| 6,307,645 B1 | * | 10/2001 | Mantell et al. | 358/1.9 |
| 6,819,352 B2 | * | 11/2004 | Mizes et al. | 347/240 |
| 6,972,866 B1 | * | 12/2005 | Bares et al. | 358/1.9 |

* cited by examiner

*Primary Examiner*—Stephen D Meier
*Assistant Examiner*—Carlos A Martinez, Jr.
(74) *Attorney, Agent, or Firm*—Kermit D. Lopez; Luis M. Ortiz; Ortiz & Lopez, PLLC (57) ABSTRACT

Xerographic machines can print documents that have unintentional streaking parallel to the process direction. There are many possible source of the streaking. Currently, the streaking is minimized by using a cross process direction dependent modulation, called a profile, to modulate a modulated light beam being scanned across the photoreceptor. The profile is purely a function of cross process direction position. The profile can minimize, and often eliminate, streaking for any one area coverage, but only for that one area coverage. Different profiles can be produced that work best for different area coverages. Choosing a profile from a group of profiles for use with each scan line can minimize parallel streaking for a wider range of area coverages.

4 Claims, 7 Drawing Sheets

STREAK COMPENSATION WITH SCAN LINE DEPENDENT ROS ACTUATION

TECHNICAL FIELD

Embodiments are generally related to printing methods and systems. Embodiments are also related to xerographic printing methods and systems. Embodiments are additionally related to compensating for cross process irregularities of a xerographic system via scan line dependent modulation of a light beam.

BACKGROUND

Xerography is a process wherein toner is selectively transferred onto a substrate and then fused. Initially, the toner is in a sump from which it is transferred onto a photoreceptor. Usually, the photoreceptor is a drum with a photoconductive coating. Using principals of static electricity, the surface of the photoreceptor receives an electrical charge. A light beam scanned over the surface of the photoreceptor can selectively discharge the photoreceptor surface. The toner is then transferred to the photoreceptor where it sticks, due to electrostatic attraction, to those parts of the photoreceptor that have been discharged. The photoreceptor is thereby coated with patterned toner.

A substrate, such as paper, can also receive an electrical charge. The substrate can be given a larger electrical charge than the photoreceptor so that the patterned toner is transferred to the substrate when the photoreceptor contacts it. The substrate is then heated so that the patterned toner fuses to the substrate surface. Those skilled in the arts of printing, photocopying, and xerography know the details of the xerographic process, the components used in the xerographic process, and the variations in the process details and components that occur in different embodiments of xerography.

When a drum photoreceptor is used, the toner is rolled on the substrate. To faithfully transfer the patterned toner, both the substrate and the drum move. The direction that the drum moves is the process direction. The path along which the substrate travels is the process path.

A light beam scanning across the photoreceptor can discharge the electric charge on the surface. Tracing a light beam across the photoreceptor creates a line, called a scan line. Modulating the light beam during a scan can cause selective discharging along the scan line. Making many scan lines as the photoreceptor moves with respect to the scanning beam can cause selective discharging within an area.

For example, a laser printer can have a light beam that moves across the surface of the photoreceptor 6000 times per second, and a photoreceptor that moves, such as a drum rotating, at ten inches per second. The printer produces 600 scan lines per inch along the process direction because the photoreceptor is moving. If the photoreceptor is 10 inches wide, modulating the light beam so that it can change 6000 times as it sweeps the photoreceptor in the less than 1/6000 of a second it takes to move across the photoreceptor results in a 600 dot per inch resolution perpendicular to the process direction.

Figure 4:
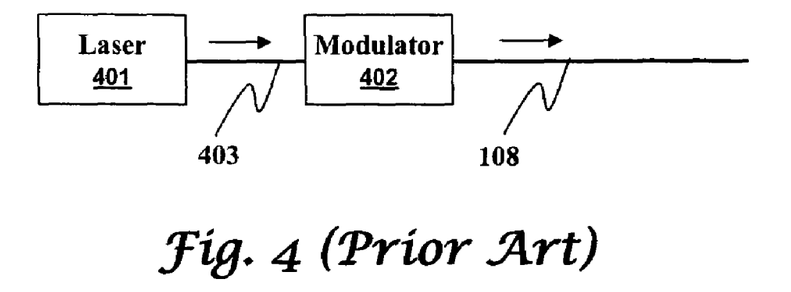
FIG. 4, labeled as prior art, illustrates one way to obtain a modulated light beam.

FIG. 4, labeled as prior art, illustrates one way to obtain a modulated light beam. A laser 401 produces a light beam 403 that passes through a modulator 402 to produce a modulated light beam 108. Those skilled in the art of optoelectronics know of many devices that can modulate light beams or laser beams.

Figure 5:
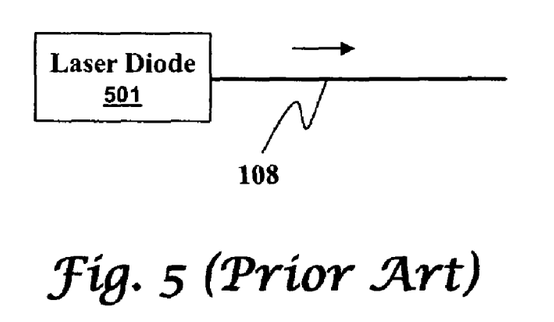
FIG. 5, labeled as prior art, illustrates another way to obtain a modulated light beam.

FIG. 5, labeled as prior art, illustrates another way to obtain a modulated light beam. A laser diode 501 can produce a modulated light beam 108 directly without the need for a separate modulator such as the modulator 402 of FIG. 4.

In the example above, a laser printer produced 600 scan lines per inch at a process speed of 10 inches per second. One technique to produce a higher process speed is to sweep the laser at a high rate across the photoreceptor. Another solution is to produce many scan lines concurrently. Producing many scan lines concurrently requires many modulated light beams.

Figure 6:
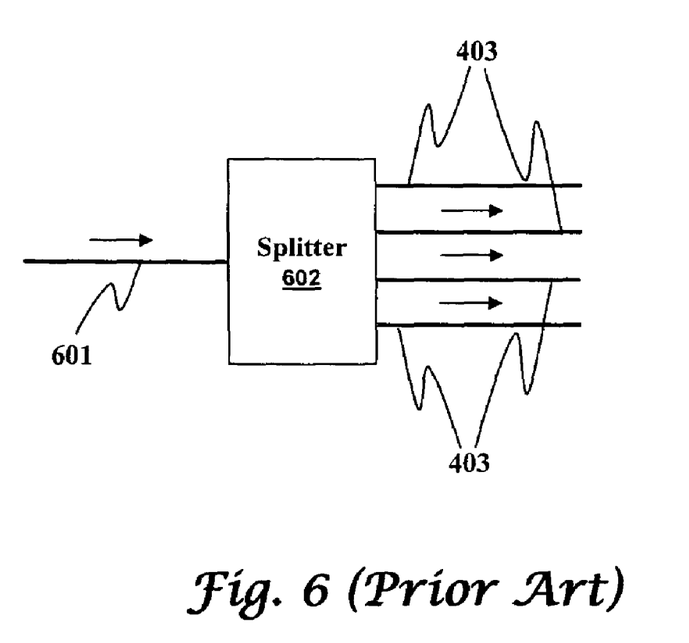
FIG. 6, labeled as prior art, illustrates one way to obtain multiple light beams.

FIG. 6, labeled as prior art, illustrates one way to obtain multiple light beams. A source light beam 601 passes into a splitter 602 that splits it into numerous light beams 403. Those skilled in the art of optics know of many devices and combinations of devices for use as a splitter 602. The numerous light beams 403 can then each be modulated individually. In some applications, it can be advantageous to modulate the source light beam 601 such that it is split into numerous modulated light beams. Using numerous laser diodes or similar subassemblies can also produce numerous modulated light beams.

Figure 7:
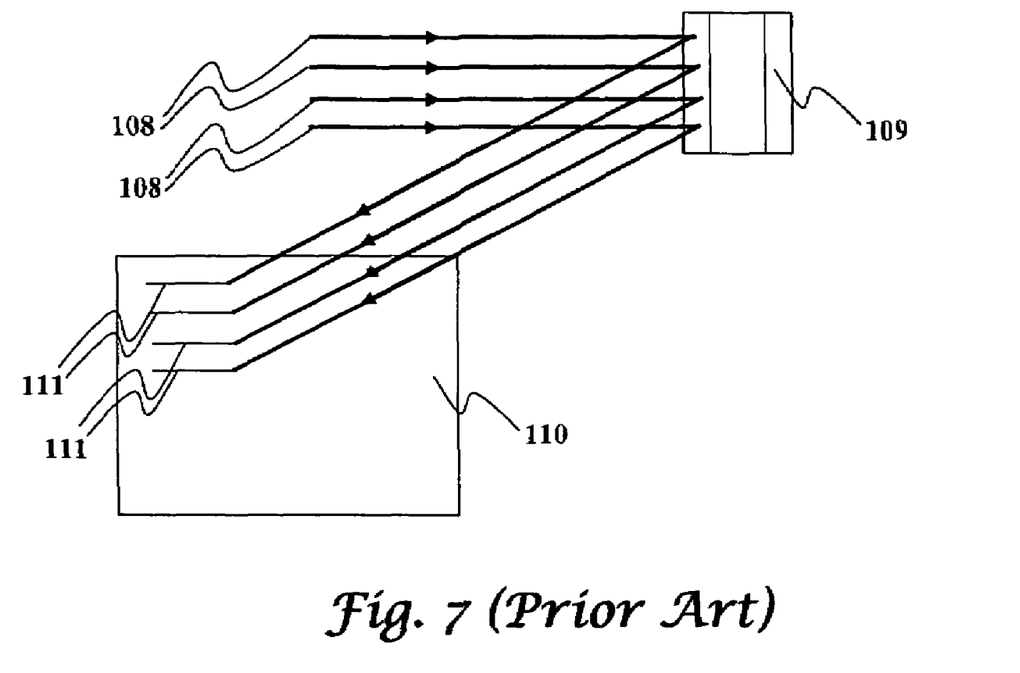
FIG. 7, labeled as prior art, illustrates a raster output scanner (ROS) causing numerous modulated light beams to concurrently produce multiple scan lines one a substrate.

FIG. 7, labeled as prior art, illustrates a motor polygon assembly (MPA) 109 causing numerous modulated light beams 108 to concurrently produce multiple scan lines 111 on a substrate 110. The polygon 109 is an optical element that has many facets arranged around a rotational axis. As the polygon spins, each facet reflects the modulated light beams 108 and causes them to scan across the substrate 110 creating scan lines 111. A new set of scan lines begins as each facet starts reflecting the modulated light beams 108. Advancing the substrate along the process direction controls the locations of the new scan lines.

Figure 8:
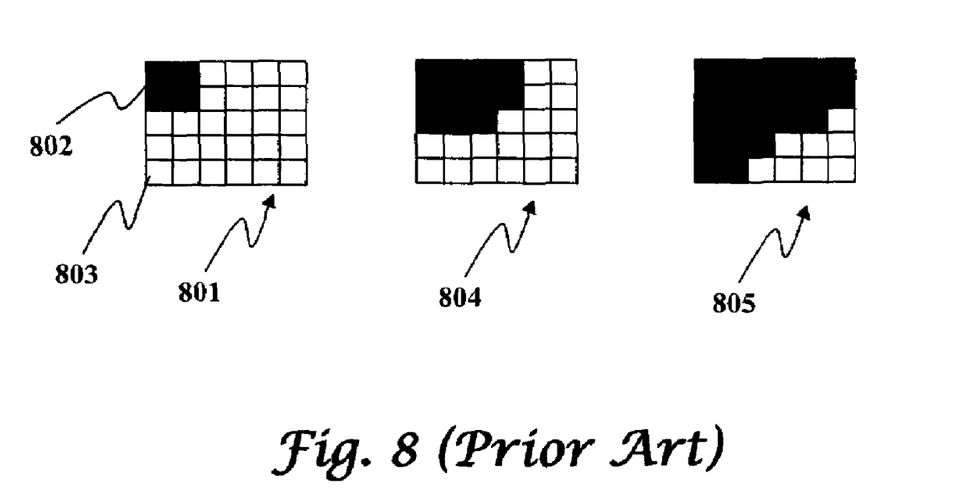
FIG. 8, labeled as prior art, illustrates halftone bricks.

FIG. 8, labeled as prior art, illustrates halftone bricks. A laser printer either prints a spot of toner or it doesn't. For example, a black and white laser printer can print black dots. It cannot print gray dots. Different shades of gray are obtained by printing patterns of black dots. A light shade of gray can be produced by covering a low percentage of an area of a substrate with black dots. For example, a first halftone brick 801 can have five rows and six columns to define an area with 30 pixels. A black pixel 802 receives toner while a white pixel 803 does not. Four of the pixels are black resulting in a light shade of grey. Similarly, a second halftone brick 804 has eleven black pixels and a third halftone brick 805 has 22 black pixels.

As with any machine, a xerographic engine can exhibit irregularities. One type of irregularity is streaking parallel to the process path. There are many possible causes of parallel streaking. By definition, a streak parallel to the process path occurs at the same place along the scan lines. In other words, it has a constant position in the cross process path direction. The cross process path direction is the direction perpendicular to the process path.

As a scan line is created, the light beams are modulated on and off to produce pixels. In an effort to reduce parallel streaking, the on intensity of the light beams can also be modulated based on their cross process position. The cross process position is defined as the distance from the start of the scan of the laser. For example, a printer producing a light streak that starts one inch from the start of the scan and ends two inches from the start of the scan can modulate the profile to try to minimize the streak. In this example, the profile can modulate light beam intensity by increasing the light intensity when the cross process position of the scan line is between one inch and two inches. The light beam now has at least two modulations, an on/off modulation for pixels that are dependent on the desired printed pattern, and an on intensity modulation for cross process compensation.

A single profile can compensate for parallel streaking. However, the compensation is perfect at only one area coverages. At different area coverages, the sensitivity to the source of streaking can be different, and the light modulation will not necessarily be of the correct magnitude to compensate for the streaking. A different modulation profile is required for each area coverage. A profile that completely compensates parallel streaks for one area coverage can over compensate or under compensate for a different area coverage.

A need therefore exists for systems and methods that can compensate for parallel streaking when different area coverages are printed on a substrate. Such a goal can be accomplished by using multiple simultaneous profiles.

BRIEF SUMMARY

Aspects of the embodiments address limitations and flaws in the prior art by producing and storing multiple profiles. As an image is printed, a profile is selected for each image line. The profile is then used to modulate the light beam as the scan line corresponding to the image line is produced.

Therefore an aspect of the embodiments is an image made of halftone bricks. When the image is printed, the lines of the halftone bricks make up the lines of the image. A memory device stores profiles that are used to modulate the intensity of a light beam as it is scanned across a photoreceptor to produce a scan line. The process of modulating a light beam with a profile and creating scan lines was discussed above. It is also an aspect of the embodiments, however, that a profile selector associates one of the profiles stored in the memory device with each image line. The associated profile is then used during the production of the scan line associated with the image line.

It is also an aspect of the embodiments to synchronize the modulated light beam and the production of the scan lines. The profile compensates for parallel streaks. As such, when the profile is used to modulate the light beam, the modulation begins and ends in a consistent place along the scan line.

It is a further aspect of the embodiments to produce modulated light beams in any of the ways that are well understood in the art of optoelectronics, such as those described above. The modulation of the light beams, however, is dependent on the profile selected by the profile selector.

It is an aspect of certain embodiments to use multiple modulated beams to concurrently write multiple scan lines, as discussed above. Unlike the systems and methods described above, however, the modulation of the light beams is dependent on the profile selected by the profile selector.

It is a still yet further aspect of the embodiments for the profile selector to monitor the uniformity of many area coverages during the calibration phase and select the profiles that are most effective in compensating the uniformity of multiple area coverages.

Another aspect of the embodiments is to select N desired area coverages and N corresponding halftone bricks. The halftone bricks have I lines. M independent scan lines are also selected. I, M, and N are integers greater than or equal to one. At least four different combinations of desired area coverage and light intensity for each scan line are then selected. The combinations include at least two different light intensities and at least two different desired area coverages. A cross process swath is printed using every one of the different combinations. Here, a cross process swath is a patch that is all the same area coverage and extends completely across the substrate in the cross process direction. Printing and measuring swaths in this way give the sensitivity of the density to changes in different combinations of the scan line intensity.

Specifically, suppose at a 25% area coverage halftone, there are M=4 independent scan lines specific to that halftone brick. If the halftone is printed when all scan lines are printed at the nominal laser power for the printer, then suppose the optical density of the subsequent print is 0.3. If the power of only scan line 1 is increased 10%, then the optical density increases to 0.35. If the power of only scan line 2 is increased 10%, then the optical density increases to 0.32. If the power of only scan line 3 is increased 10%, then the optical density increases to 0.34. If the power of only scan line 4 is increased 10%, then the optical density remains the same. The sensitivity to each of the scan lines is determined by calculating the ratio of the change in optical density to the change in laser intensity.

Yet another aspect of the embodiments is to measure the cross process swaths to detect parallel streaks. Analysis of the measurements, desired area coverage, halftone bricks, and light intensity enables the production of at least two profiles that can be used with different image lines to reduce parallel streaks. Notice that an image line contains desired area coverages.

An aspect of certain embodiments is to use all the possible combinations of light intensity and desired area coverage to print swaths. There are N*M possible combinations. If desired, the analysis of the results of printing and measuring the M*N combinations can include setting up and solving a linear algebraic equation.

Another aspect of certain embodiments is to select halftone bricks that respond well to streak compensation using scan line dependent profiles. For example, FIG. 8 shows 3 different halftone bricks of different area coverages. Notice that the third, fourth, and fifth lines of the first halftone brick 801 is all white. A scan line that includes either the third, fourth or fifth halftone brick line can be corrected for the second halftone brick 804 or the third halftone brick 805 while having no effect on the first halftone brick 801. Similarly, the second halftone brick 804 has all white fourth and fifth lines. A scan line that includes either a fourth or fifth halftone brick line can be corrected for the third halftone brick 805 with no effect on the first halftone brick 801 or second halftone brick 804.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Figure 1:
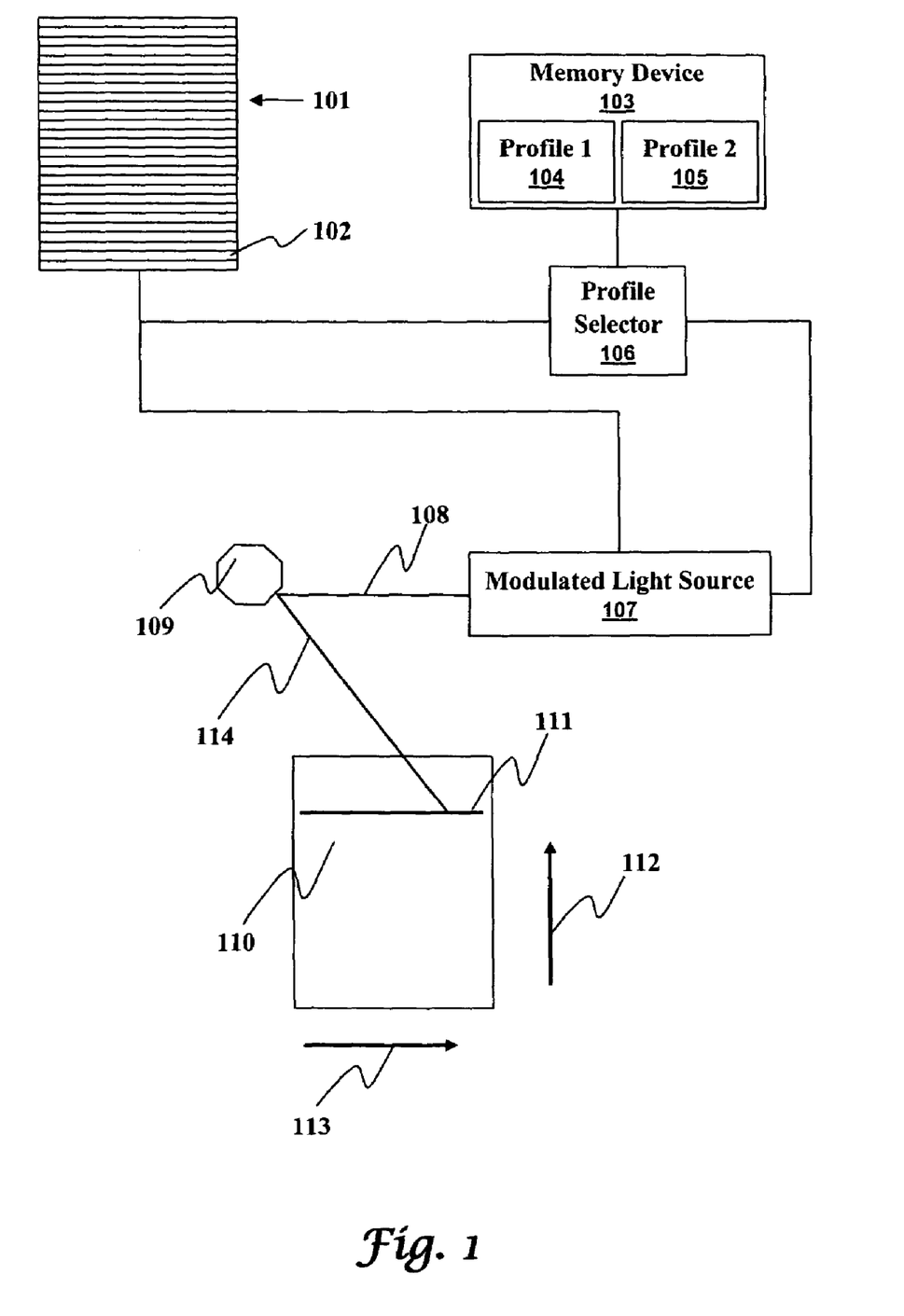
FIG. 1 illustrates a system for using one of multiple profiles to modulate a light beam during production of a scan line in accordance with an aspect of the embodiments.

FIG. 1 illustrates a system for using one of multiple profiles to modulate a light beam 108 during production of a scan line 111 in accordance with an aspect of the embodiments. An image 101 made of scan lines 102 can be printed by a laser printer. As discussed above, a laser printer produces black dots on a substrate (not shown). A color printer will consist of other modules that print cyan, yellow, magenta or other colors and this light modulation technique applies in general to any one of these colors. The image to print is quantized into pixels. As such, different shades of gray are produced from halftone bricks. In each halftone brick, some of the pixels are exposed by the laser and thus will print black, while other pixels are not exposed by the laser and will not print black. The image can be made of row upon row of halftone brick. Bricks that are 5 pixels long in the process direction, as in FIG. 8 are lined up to create five image lines. As such, the image 101 specifies a very large pattern made of lines that are in turn made of toner dots to be fused onto the substrate.

A memory device 103 stores profiles that control the intensity of the laser as it sweeps the photoreceptor, such as profile 1 104 and profile 2 105, that can be used to compensate parallel streaks. A profile selector 106 determines which line is being imaged and selects a profile with which to print this scan line. The profile selected is intended to reduce parallel streaks. The image line and the profile are used by a modulated light source 107 to produce a modulated light beam 108. The modulated light beam is reflected by a facet on a raster output scanner (ROS) 109. As the ROS rotates, it cause the reflected modulated light beam 114 to move across a photoreceptor 110 to produce a scan line 111. The photoreceptor 110, often a spinning drum, rotates along the process direction 112 while the scan lines are scanned along the cross process direction 113.

Figure 2:
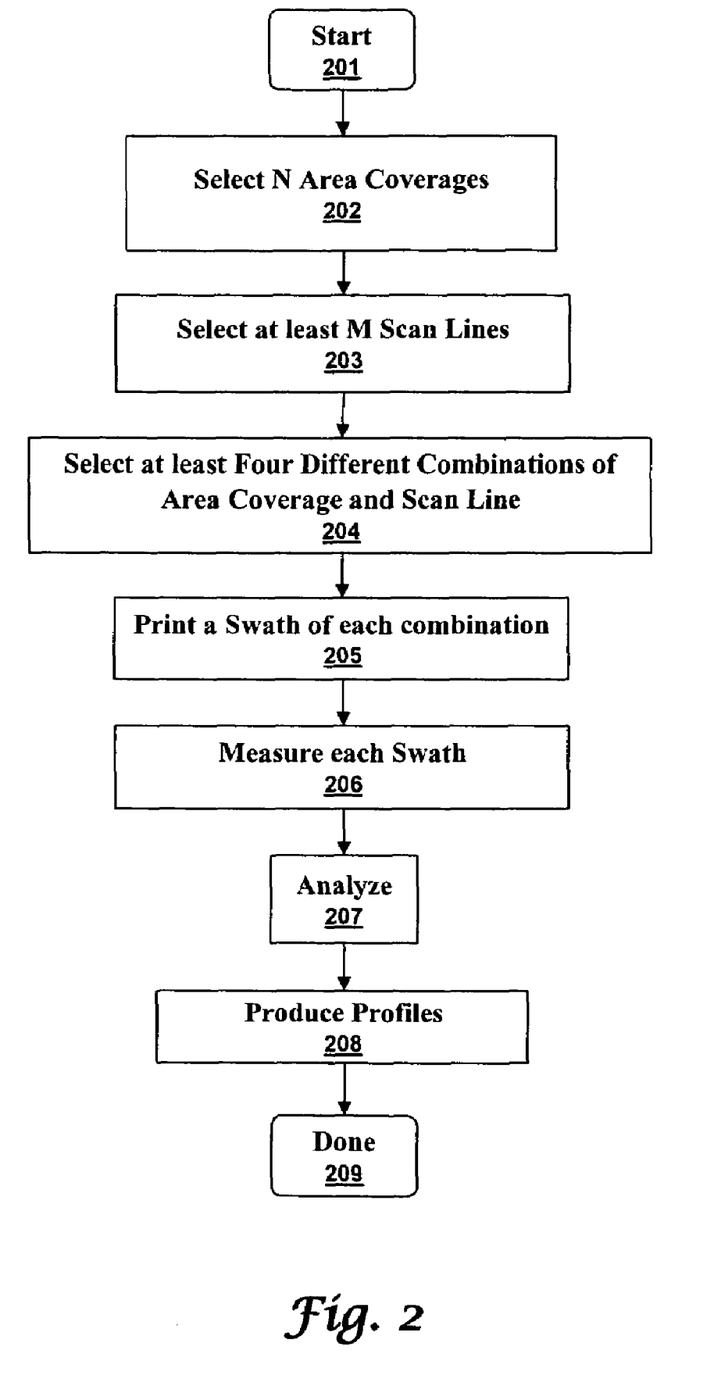
FIG. 2 illustrates a high level flow diagram of producing profiles in accordance with an aspect of the embodiments.

FIG. 2 illustrates a high level flow diagram of producing profiles in accordance with an aspect of the embodiments. After the start 201, N halftone bricks corresponding to N desired area coverages are selected 202 where N is an integer greater than one. M scan lines are selected 203 where M is also on integer greater than one. At least four different combinations of desired area coverage and scan lines are selected 204 with at least two desired area coverages and at least two scan lines included in the selection. Each combination is used to print a cross process swath 205 and the swaths are then measured 206.

Cross process swaths can be measured using a variety of instruments known to those skilled in the arts of printing or imaging. A measured area coverage as a function of cross process direction position is produced. The measured area coverages, desired area coverages, light intensities, and halftone bricks can all be considered in analyzing the measurements 207 and the analysis used to produce profiles 208 that can reduce parallel streaks. The process is then done 209.

In one embodiment, a linear equation is solved to find profiles. For example, (M+1)*N cross process swaths are printed where N is the number of different area coverages and M is the number of independent scan lines. One swath is printed with no light intensity changed for each area coverage. The cross process swaths are measured at different cross process positions, denoted as X. Each area coverage is filled according to the thresholds specified by the halftone brick. The halftone brick that is used in printing the cross process swath has I lines. The linear equation is E(x)=Ae(x) where $$E(x) = [\ E_1(x)\ \ E_2(x)\ \ \cdots\ \ E_N(x)\ ]^T,$$

$$e(x) = [\ e_1(x)\ \ e_2(x)\ \ \cdots\ \ e_M(x)\ ]^T, \text{ and}$$

$$A(x) = \begin{bmatrix} A_{11} & A_{12} & \cdots & A_{1M} \\ A_{21} & A_{22} & & \vdots \\ \vdots & & \ddots & \vdots \\ A_{N1} & \cdots & \cdots & A_{NM} \end{bmatrix}.$$

Here, $A_{ni}$ is the sensitivity of the printed density for area coverage n to light beam intensity changes to scan line combination m of the halftone brick corresponding to area coverage n. Recalling the first halftone brick 801 of FIG. 8, if it corresponds to the first area coverage, then $A_{11}$=0. In general though $A_{ni}$ is calculated from cross process swath measurements. Specifically $A_{ni}$ is the ratio of the difference between the average optical density of the swath at area coverage n and the swath where all beams are of equal light intensity to the change in light intensity.

$E_n(x)$ is the change in the printed density of the nth area coverage caused by the exposure modulation and be calculated as $$E_n(x) = \sum_{j=1}^{kI} E_{nj}(x)$$

Where $E_n(x)$ is the contribution of scan line j to a change in density of area coverage n at cross process position x, k is an integer greater than 0, and I is, as before, the number of lines in a halftone brick. $e_m(x)$ is the exposure of the mth scan line combination.

In the calibration phase of the process, the matrix A is measured by intentionally printing the swatches at two different exposures for a modulation in each scan line. The difference in the printed density of cross process swath i to a change in the exposure of beam j is proportional to the element $A_{ij}$. In the calculation phase of the process, the printed density E(x) for the different area coverage cross process swaths are measured as a function of X for a uniform applied exposure. Now since E(x) and the matrix A is known, the linear equation, given above is solved for e(x). Solving the equation for numerous values of x, the cross process position yields profiles.

Figure 9:
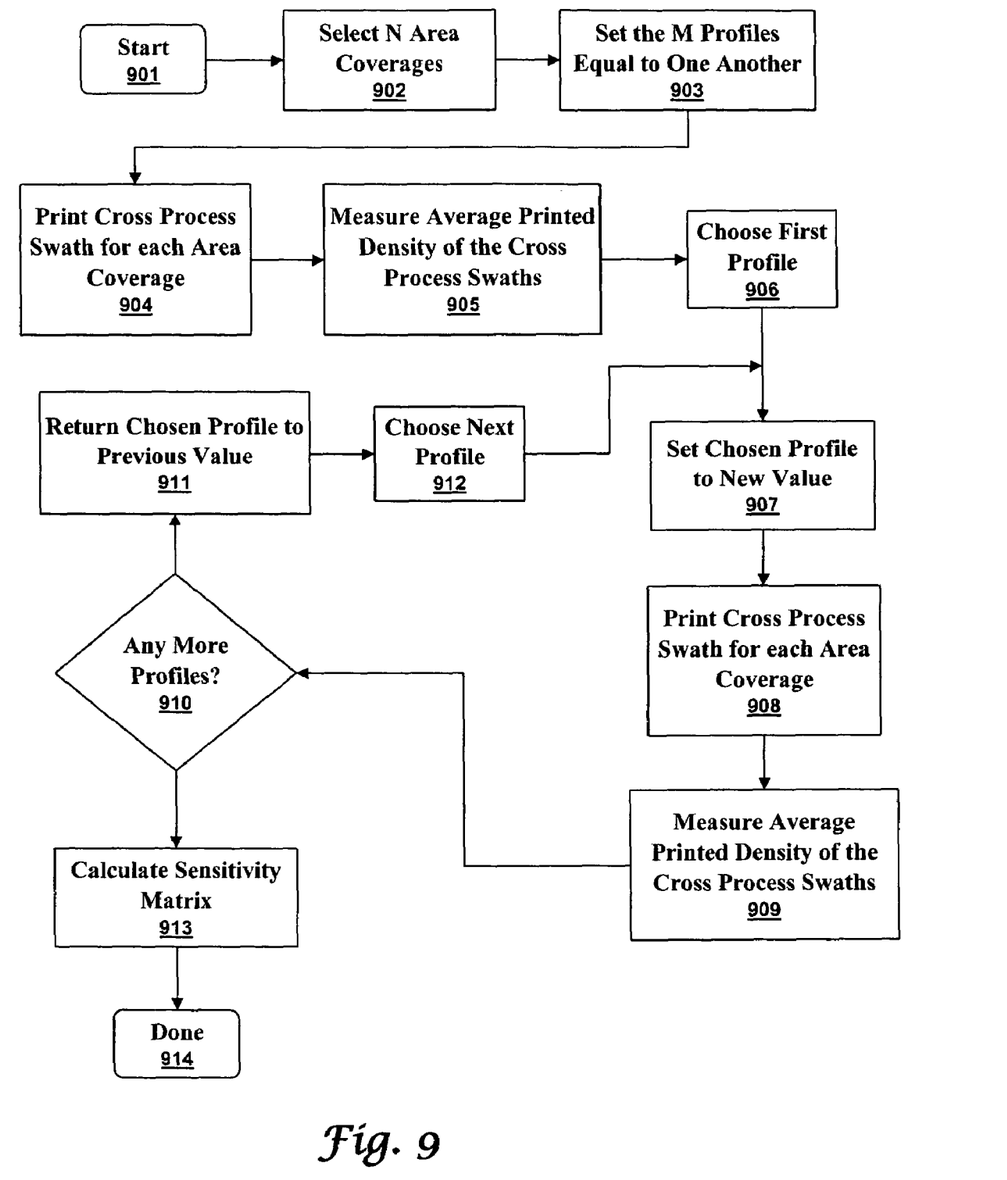
FIG. 9 illustrates a high level flow diagram of the calibration phase of determining the profiles in accordance with aspects of the embodiments.

FIG. 9 illustrates a high level flow diagram of the calibration phase of determining the profiles in accordance with aspects of the embodiments. After the start 901, N different area coverages are preselected by those skilled in the art of halftones 902. All M profiles are set equal to one another 903 and cross process swaths of the halftone bricks are printed 904. The cross process swaths produced at block 904 are called nominal cross process swaths. The average printed density of the cross process swaths are measured 905 by devices either internal or external to the printer. Next, profile 1 is chosen 906. The intensity of the chosen profile is set to a different value 907 while profiles 2 through M are held at their nominal value. The N different area coverages are printed 908 and measured 909. If there are any more profiles 910, the currently chosen profile is returned to its previous value 911. The next profile is then chosen 912, changed 907, used for printing 908, and the results measured 909. If no more profiles remain 910, the sensitivity matrix A is calculated 913 and the process is done 914.

Figure 10:
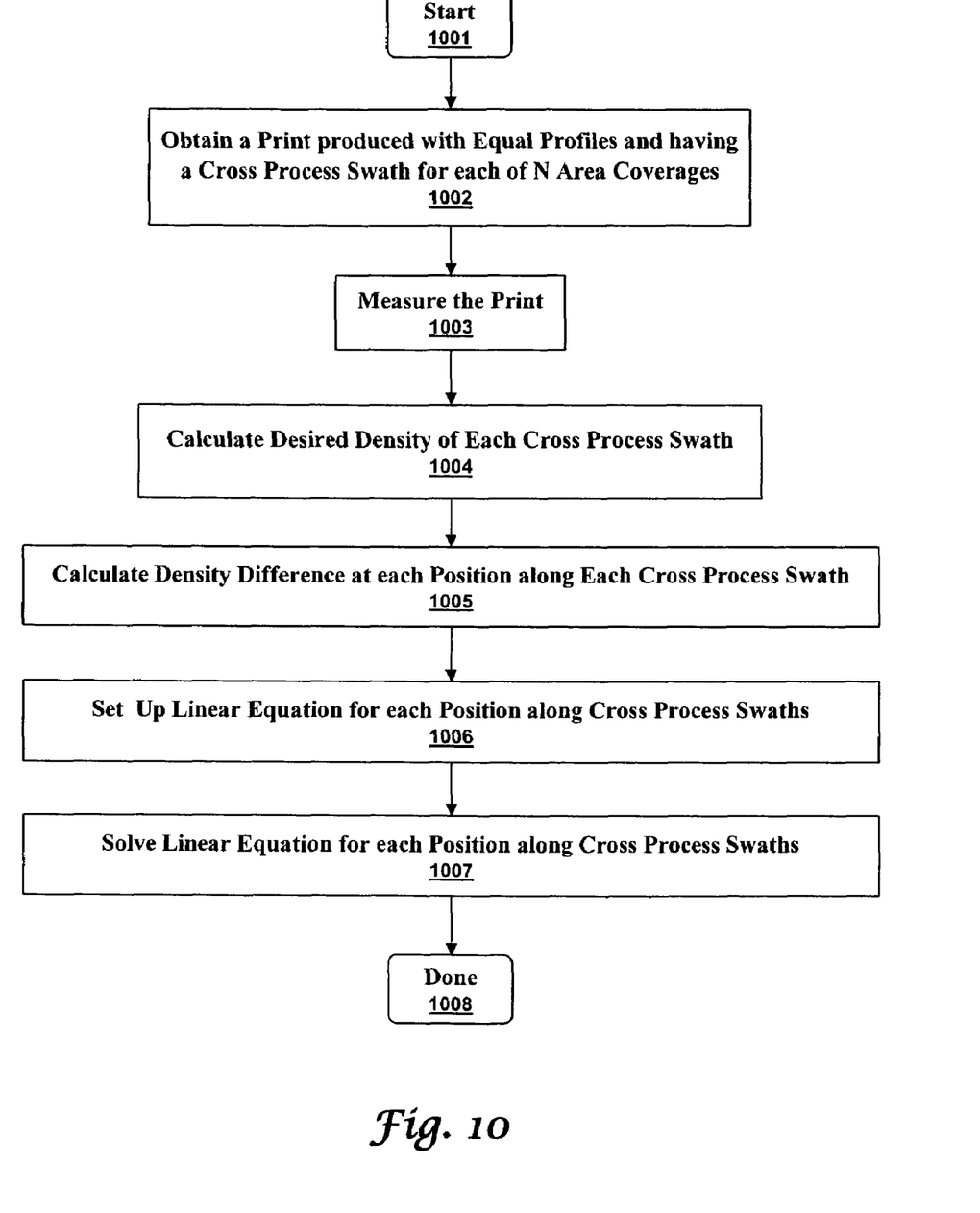
FIG. 10 illustrates a high level flow diagram of the profile calculation phase of determining the correction profiles in accordance with aspects of the embodiments.

FIG. 10 illustrates a high level flow diagram of the profile calculation phase of determining the correction profiles in accordance with aspects of the embodiments. After the start 1001 a print having N nominal cross swaths is obtained with a cross process swath for each of the N areas coverages 1002. Such a print is available after block 904 of FIG. 9. The print is then measured 1003 and the desired densities calculated for each cross process swath 1004. The desired density is calculated to be the density of the cross process swath averaged in the cross process direction. The density difference $E(x)$ is calculated at each position in the cross process direction for each cross process swath 1005 and is the difference between the measured density when no correction is applied and the desired density. At each position x in the cross process direction, N values of $E(x)$ are determined and a linear equation set up 1006. At each position x in the cross process direction, the linear equation is solved 1007 for $e(x)$, the change in exposure for each laser beam at that position that will change the density of the strip at that location from its current printed density to the desired printed density. Finally, the process is done 1008

Figure 3:
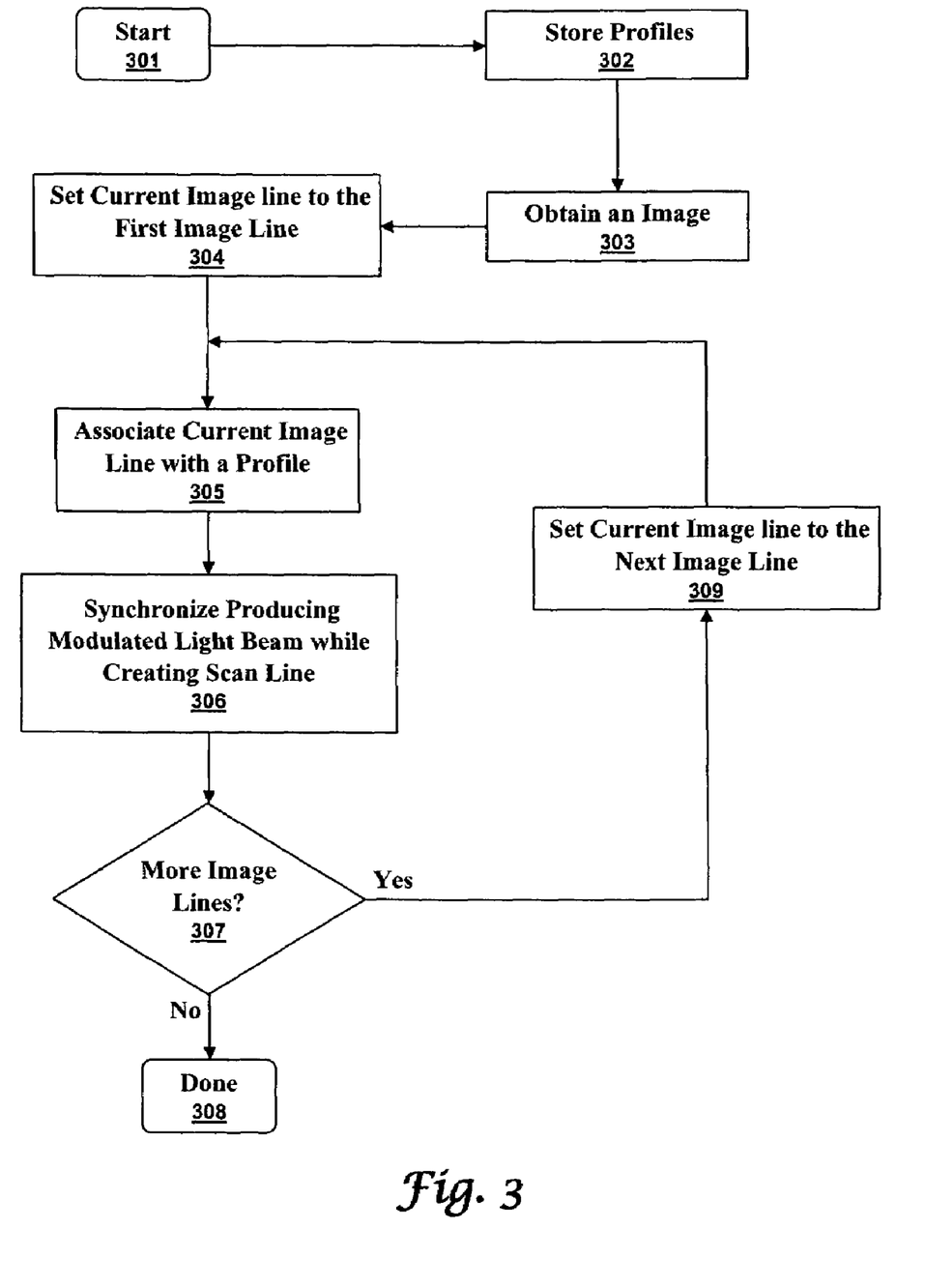
FIG. 3 illustrates a high level flow diagram of using one of multiple profiles to modulate a light beam during production the an image in accordance with an aspect of the embodiments.

FIG. 3 illustrates a high level flow diagram of using one of multiple profiles to modulate a light beam during production of an image in accordance with an aspect of the embodiments. After the start 301, at least two profiles are stored 302. An image is obtained 303 and prepared for printing by setting the current scan line to the first scan line 304. The current scan line is then associated with a profile 305 and then used, along with the associated profile to modulate the on intensity of the laser as it is turned on and off as it writes a scan line of a halftoned image. Producing the modulated light beam and creating the scan line are synchronized 306. If there are no more image lines 307, the process is done 308. Otherwise, the current line is set to the next image line 309 and the process loops back to selecting a profile 305.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    selecting N halftone bricks for printing N desired area coverages wherein each of the N halftone bricks comprises I lines and selecting M scan lines wherein I, M, and N are integers greater than one, such that the combination of said positive integers for I, M, and N do not result in a situation where the said N desired area are not repeated and where the said M scan lines are not repeated;
    selecting at least four different combinations of at least two of the N desired area coverages and at least two of the M scan lines and printing at least four cross process swaths corresponding to the at least four of the four different combinations;
    printing at least two nominal cross process swaths corresponding to the at least two of the N desired area coverages;
    measuring the at least four cross process swaths and the at least two nominal cross process swaths to determine a sensitivity matrix;
    measuring the printed density of the at least two nominal cross process swaths to determine at least two print density nonuniformities; and
    determining at least two correction profiles from the sensitivity matrix and the at least two print density nonuniformities.

2. The method of claim 1 wherein M*N patches are printed such that one patch corresponding to each possible combination of the N desired area coverages and M scan lines is printed.

3. The method of 2 wherein the at least two profiles are produced by solving a linear algebraic equation.

4. The method of 1 further comprising producing the N halftone bricks such that the correction profiles are determined and applied as a correction for printing images.

* * * * *